(12) United States Patent
Harel (10) Patent No.: US 11,889,389 B2
(45) Date of Patent: *Jan. 30, 2024

(54) DISTRIBUTED COMMUNICATIONS SYSTEMS (DCSS) SUPPORTING VIRTUALIZATION OF REMOTE UNITS AS CITIZENS BAND RADIO SERVICE (CBRS) DEVICES (CBSDS)

(71) Applicant: CORNING RESEARCH & DEVELOPMENT CORPORATION, Corning, NY (US)

(72) Inventor: Dror Harel, Hod Hasharon (IL)

(73) Assignee: Corning Research & Development Corporation, Corning, NY (US)

( * ) Notice: Subject to any disclaimer, the term of this patent is extended or adjusted under 35 U.S.C. 154(b) by 100 days.

This patent is subject to a terminal disclaimer.

(21) Appl. No.: 17/533,331

(22) Filed: Nov. 23, 2021

(65) Prior Publication Data

US 2022/0217615 A1 Jul. 7, 2022

Related U.S. Application Data

(63) Continuation of application No. 16/673,575, filed on Nov. 4, 2019, now Pat. No. 11,184,743.

(51) Int. Cl.
*H04W 72/04* (2023.01)
*H04W 4/10* (2009.01)
(Continued)

(52) U.S. Cl.
CPC ........... *H04W 4/10* (2013.01); *H04W 40/248* (2013.01); *H04W 52/146* (2013.01);
(Continued)

(58) Field of Classification Search
CPC ... H04W 4/10; H04W 72/20; H04W 72/1242; H04W 72/0473; H04W 40/248;
(Continued)

(56) References Cited

U.S. PATENT DOCUMENTS

2006/0229068 A1* 10/2006 Niemela ............... H04W 48/18
455/552.1
2013/0294318 A1 11/2013 Amerga et al.
(Continued)

*Primary Examiner* — Wei Zhao
(74) *Attorney, Agent, or Firm* — William D. Doyle (57) ABSTRACT

Distributed communications systems (DCSs) supporting virtualization of remote units as citizens band radio service (CBRS) devices (CBSDs) are disclosed. In examples discussed herein, the DCS includes a routing circuit that is coupled to a number of remote units configured to communicate a downlink communications signal(s) and an uplink communications signal(s) in one or more CBRS channels. In this regard, a CBRS control circuit is provided to present each of the remote units as a uniquely identifiable virtual CBSD to a spectrum access system (SAS) and facilitate communications between the SAS and the remote units. As such, the SAS may be able spoofed to treat the uniquely identifiable virtual CBSD as real CBSDs to uniquely identify each of the remote units for CBRS channel assignment and/or transmission power control. As a result, it may be possible to support CBRS in the DCS in compliance with the Federal Communications Commission (FCC) requirements.

24 Claims, 7 Drawing Sheets

(51) Int. Cl.
  *H04W 88/08* (2009.01)
  *H04W 72/044* (2023.01)
  *H04W 52/14* (2009.01)
  *H04W 40/24* (2009.01)
  *H04W 72/20* (2023.01)
  *H04W 52/36* (2009.01)
  *H04W 84/04* (2009.01)

(52) U.S. Cl.
  CPC ....... *H04W 72/0473* (2013.01); *H04W 72/20* (2023.01); *H04W 88/085* (2013.01); *H04W 52/367* (2013.01); *H04W 84/042* (2013.01)

(58) Field of Classification Search
  CPC ............. H04W 52/146; H04W 88/085; H04W 72/047; H04W 72/142; H04N 7/15; G06F 3/013
  See application file for complete search history.

(56) References Cited

U.S. PATENT DOCUMENTS

2017/0111094 A1* 4/2017 Sartori ................ H04B 7/0695
2017/0180938 A1   6/2017 Smith
2018/0332605 A1* 11/2018 Pelletier .............. H04W 72/569

* cited by examiner

DISTRIBUTED COMMUNICATIONS SYSTEMS (DCSS) SUPPORTING VIRTUALIZATION OF REMOTE UNITS AS CITIZENS BAND RADIO SERVICE (CBRS) DEVICES (CBSDS)

CROSS-REFERENCE TO RELATED APPLICATIONS

This application is a continuation of U.S. patent application Ser. No. 16/673,575, filed Nov. 4, 2019, which claims the benefit of priority under 35 U.S.C. § 119 of U.S. Provisional Application Ser. No. 62/908,066, filed Sep. 30, 2019, which are incorporated herein by reference in their entireties.

BACKGROUND

The disclosure relates generally to distributed communications systems that are configured to support citizens band radio service (CBRS), and more particularly to a distributed radio communications system that is configured to enable communications between a CBRS spectrum access system (SAS) and a number of remote units.

Wireless communications is rapidly growing, with ever-increasing demands for high-speed mobile data communication. As an example, local area wireless services (e.g., so-called "wireless fidelity" or "WiFi" systems) and wide area wireless services are being deployed in many different types of areas (e.g., coffee shops, airports, libraries, etc.). Communications systems have been provided to transmit and/or distribute communications signals to wireless devices called "clients," "client devices," or "wireless client devices," which must reside within the wireless range or "cell coverage area" in order to communicate with an access point device. Example applications where communications systems can be used to provide or enhance coverage for wireless services include public safety, cellular telephony, wireless local access networks (LANs), location tracking, and medical telemetry inside buildings and over campuses. One approach to deploying a communications system involves the use of radio node/base station that transmits communications signals distributed over a physical communications medium remote unit forming radio frequency (RF) antenna coverage areas, also referred to as "antenna coverage areas." The remote units each contain or are configured to couple to one or more antennas configured to support the desired frequency(ies) of the radio node to provide the antenna coverage areas. Antenna coverage areas can have a radius in the range from a few meters up to twenty meters, as an example. Another example of a communications system includes radio nodes, such as base stations, that form cell radio access networks, wherein the radio nodes are configured to transmit communications signals wirelessly directly to client devices without being distributed through intermediate remote units.

Figure 1:
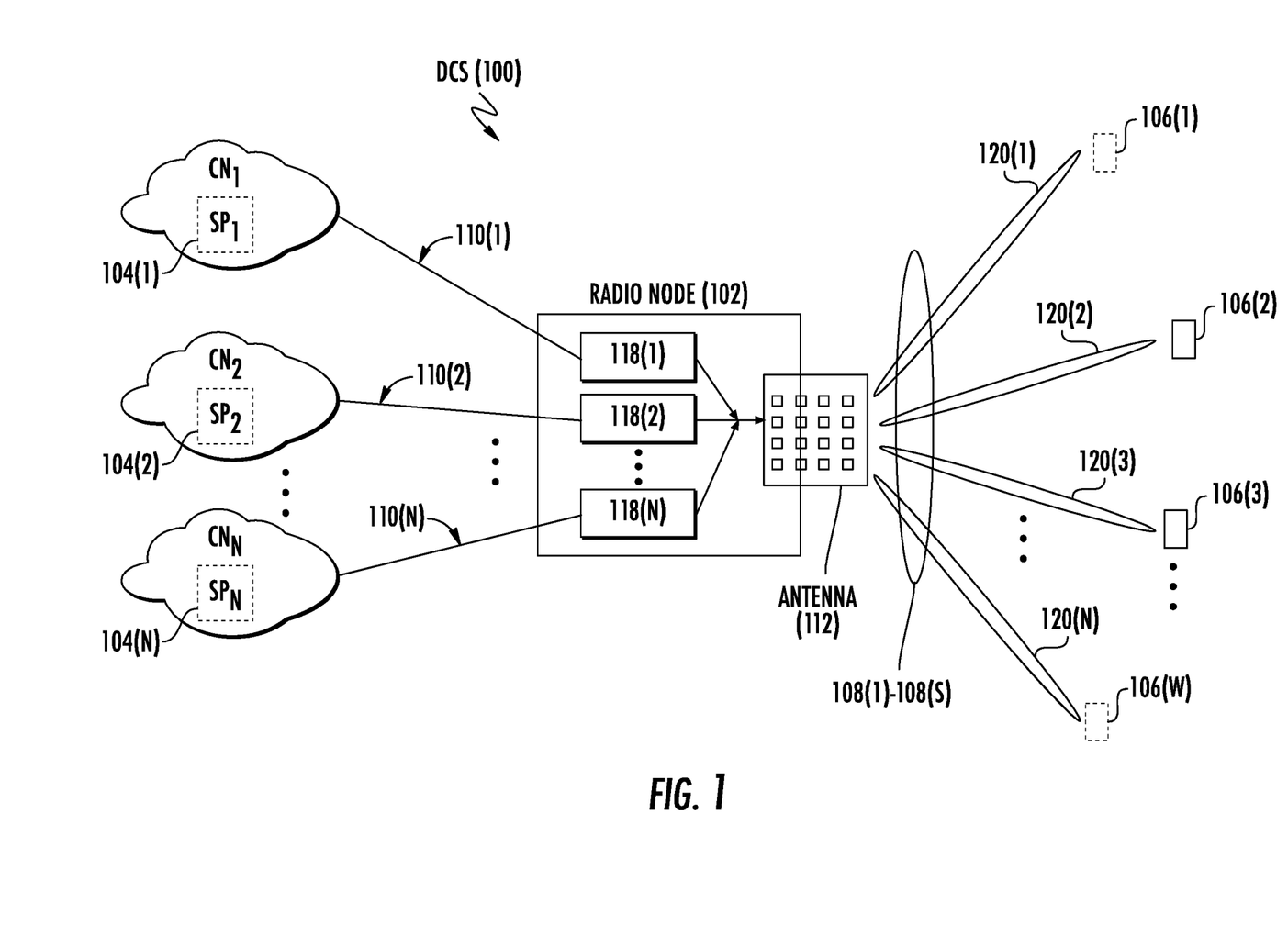
FIG. 1 is a schematic diagram of an exemplary distributed communications system (DCS) that includes a conventional single operator radio node configured to support distribution of communications signals for multiple service providers.

For example, FIG. 1 is an example of a distributed communications system (DCS) 100 that includes a radio node 102 configured to support one or more service providers 104(1)-104(N) as signal sources (also known as "carriers" or "service operators"—e.g., mobile network operator (MNO)) and wireless client devices 106(1)-106(W). For example, the radio node 102 may be a base station (eNodeB) that includes modem functionality and is configured to distribute communications signal streams 108(1)-108(S) to the wireless client devices 106(1)-106(W) based on downlink communications signals 110(1)-110(N) received from the service providers 104(1)-104(N). The communications signal streams 108(1)-108(S) of each respective service provider 104(1)-104(N) in their different spectrums are radiated through antennas 112 to the wireless client devices 106(1)-106(W) in communication range of the antennas 112. For example, the antenna 112 may be an antenna array. As another example, the radio node 102 in the DCS 100 in FIG. 1 can be a small cell radio access node ("small cell") that is configured to support multiple service providers 104(1)-104(N) by distributing a communications signal stream 108(1)-108(S) for the multiple service providers 104(1)-104(N) based on respective downlink communications signals 110(1)-110(N) received from a respective evolved packet core (EPC) network $CN_1$-$CN_N$ of the service provider 104(1)-104(N) through interface connections. The radio node 102 includes a radio circuit 118(1)-118(N) for each service provider 104(1)-104(N) that is configured to create multiple simultaneous signal beams ("beams") 120(1)-120(N) for the communications signal streams 108(1)-108(S) to serve multiple wireless client devices 106(1)-106(W). For example, the multiple beams 120(1)-120(N) may support multiple-input, multiple-output (MIMO) communications.

Figure 2A:
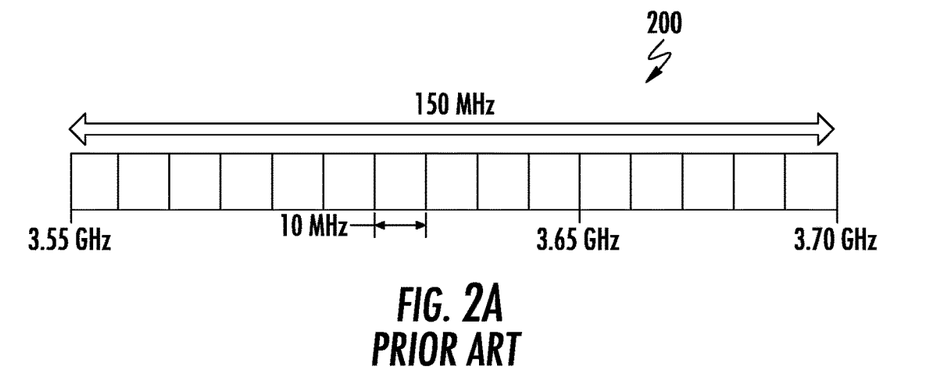
FIGS. 2A-2C illustrate existing and proposed spectrum allocation schemes within the citizens broadband radio service (CBRS)
Figure 2B:
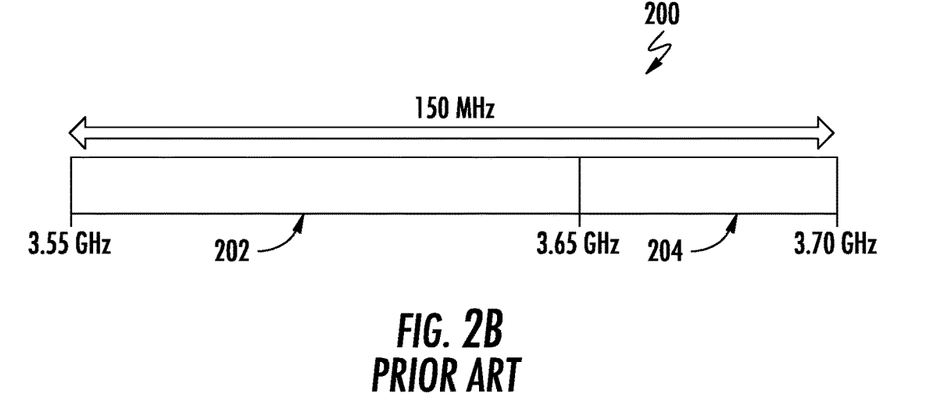
Figure 2C:
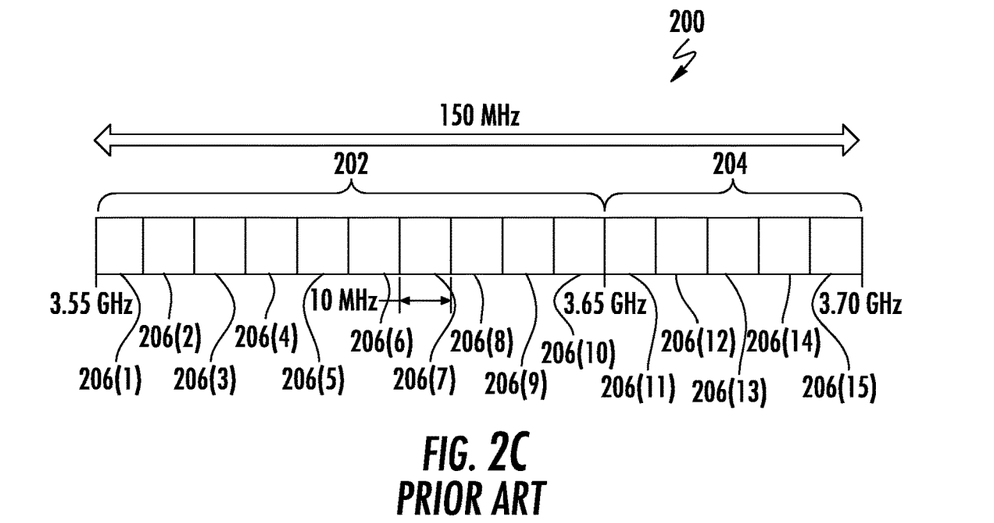

The radio node 102 of the DCS 100 in FIG. 1 may be configured to support service providers 104(1)-104(N) that have different frequency spectrum and do not share spectrum. Thus in this instance, the downlink communications signals 110(1)-110(N) from the different service providers 104(1)-104(N) do not interfere with each other even if transmitted by the radio node 102 at the same time. The radio node 102 may also be configured as a shared spectrum communications system where the multiple service providers 104(1)-104(N) have shared spectrum. In this regard, the capacity supported by the radio node 102 for the shared spectrum is split (i.e. shared) between the multiple service providers 104(1)-104(N) for providing services to the subscribers. An example of a shared spectrum is the citizens band radio service (CBRS). CBRS is a "cellular like" service that is provided under a shared spectrum scheme in the 3.55-3.70 GigaHertz (GHz) frequency band, which therefore has a bandwidth of 150 MegaHertz (MHz). FIG. 2A illustrates the 150 MegaHertz (150 MHz) frequency band 200 between 3.55 GHz and 3.70 GHz to which the Federal Communications Commission (FCC) is opening access as the CBRS. The radio node 102 in FIG. 1 may be configured to support CBRS as an example. As shown in FIG. 2B, the overall 150 MHz CBRS frequency band 200 is currently divided into a lower 100 MHz section 202 and an upper 50 MHz section 204, with the lower 100 MHz section 202 being used by Navy radars in coastal areas and space-to-earth fixed-satellite service (FSS) stations. The upper 50 MHz section 204 is currently used by WiMax fixed wireless baseband services, three ground radar stations, eighty-six grandfathered space-to-earth FSS stations, and Navy radar for ships located farther than 44 miles from the coast. However, as illustrated in FIG. 2C, the FCC is opening up fifteen (15) 10-MHz unpaired channels 206(1)-206(15) for radio services through citizens broadband radio service devices (CBSDs), which are devices configured to operate within the CBRS frequencies and according to CBRS rules. The CBSDs, or parts thereof, may be incorporated in radio nodes within radio access networks (RANs) along with other devices and networks. In this regard as illustrated in FIG. 2C, in the new CBRS framework, the 150 MHz CBRS frequency band 200 will be divided into fifteen 10-MHz channels 206(1)-206(15). Other divisions are also possible, and a division to fifteen 10-MHz channels 206(1)-206(15) is illustrated as an example of one possible division. Channels 206(1)-206(10) in the lower 100 MHz section 202 will operate according to a three-tier model, and channels 206(11)-206(15) in the upper 50 MHz section 204 will operate according to a two-tier model.

Spectrum allocation or channel allocation in a CBRS communications system is performed by a technique or procedures that occur independently or semi-independently of service providers by a Spectrum Allocation System (SAS). As an example, a CBRS system has 150 MHz of spectrum, and has 1,500 possible E-UTRA Absolute Radio Frequency Channel Numbers (EARFCNs). Thus, for example, if a CBRS communications system is operated in a stadium or arena by a third party, the CBRS system may be dynamically assigned a channel, or operating spectrum, by a SAS. If the radio node 102 in FIG. 1 is configured to support CBRS, the radio node 102 will have an interface to a managing SAS. Based on the location of the radio node 102 and its license grade, the SAS instructs which channel frequencies the radio node 102 should use and at what maximum transmission power level.

The radio node 102 in FIG. 1 can also be coupled to a distributed communications system, such as a distributed antenna system (DAS), such that the radio circuits 118(1)-118(N) remotely distribute the downlink communications signals 110(1)-110(N) of the multiple service providers 104(1)-104(N) to remote units. The remote units each include an antenna that may be similar to the antenna 112 in FIG. 1 for radiating the downlink communications signals 110(1)-110(N) to subscribers. Thus, in this scenario, if the radio node 102 were configured to support a shared spectrum such as CBRS, every restriction enforced by the SAS on the radio node 102 as a result of spectrum coordination would affect all the remote units of the distributed communications system coupled to the radio node 102. In other words, whichever channels have been dynamically allocated by the SAS to the radio node 102 for the shared spectrum are the only channels of the shared spectrum that will be distributed to the remote units of the DCS 100 coupled to the radio node 102. Also, if the radio node 102 in FIG. 1 is configured as a shared spectrum system to support service providers 104(1)-104(N) having shared spectrum, at any given time and location, the shared spectrum of the radio node 102 can only be used by a single service provider 104(1)-104(N). Otherwise, the downlink communications signals 110(1)-110(N) in the shared spectrum from multiple active service providers 104(1)-104(N) will interfere with each other. Moreover, downlink communications signals 110(1)-110(N) in the shared spectrum may interfere with each other when communicated to the same remote unit in a coupled distributed communications system. Also, downlink communications signals 110(1)-110(N) in the shared spectrum communicated to the remote units may cause a subset of the remote units in the DCS 100 to experience interference with each other.

Notably, the FCC does not explicitly define how the DCS 100, which includes multiple transmitting nodes such as the radio node 102 and the remote units, should be architectured to support CBRS. However, according to FCC part 96.3, if a CBSD includes multiple nodes or networks of nodes, the CBSD requirements as discussed above would be applicable to each of the transmitting nodes. However, in the DCS 100, the radio node 102 and the remote units may be configured to operate based on a common cell identification. In this regard, if the common cell identification is used to identify the radio node 102, then the SAS may not be able to uniquely differentiate each of the remote units from the radio node 102. As a result, it may become difficult for the SAS to manage CBRS channels and regulate maximum transmission power for the remote units in the DCS 100. AS such, it may be desirable for the DCS 100 to support CBRS based on the requirements of FCC part 96.3.

No admission is made that any reference cited herein constitutes prior art. Applicant expressly reserves the right to challenge the accuracy and pertinency of any cited documents.

SUMMARY

Embodiments disclosed herein include distributed communications systems (DCSs) supporting virtualization of remote units as citizens band radio service (CBRS) devices (CBSDs). In examples discussed herein, a DCS includes a routing circuit that is coupled to a number of remote units configured to communicate a downlink communications signal(s) and an uplink communications signal(s) in one or more CBRS channels. For example, the DCS may be or include a distributed antenna system (DAS). Notably, the routing circuit may correspond to a CBRS device (CBSD) cell identification(s) that is configured to identify a CBRS signal node(s). Thus, all of the remote units in the DCS may appear as a single CBSD, making it difficult or impossible for a spectrum access system (SAS) to unambiguously identify each remote unit for channel assignment and/or transmit power adjustment to support CBRS. In this regard, in exemplary aspects disclosed herein, a CBRS control circuit is provided to present each of the remote units as a uniquely identifiable virtual CBSD (e.g., a software-based identification logically mapped to each of the remote units) to the SAS and facilitate communications between the SAS and the remote units. As such, the SAS may be spoofed to treat the uniquely identifiable virtual CBSD as real CBSDs to uniquely identify each of the remote units for CBRS channel assignment and/or transmission power control. As a result, it may be possible to support CBRS in the DCS in compliance with the Federal Communications Commission (FCC) requirements.

One exemplary embodiment of the disclosure relates to a DCS. The DCS includes a routing circuit corresponding to at least one CBSD cell identification. The routing circuit is coupled to a plurality of remote units configured to communicate at least one downlink communications signal and at least one uplink communications signal in one or more CBRS channels. The DCS also includes a CBRS control circuit coupled to the routing circuit. The CBRS control circuit is configured to generate a plurality of CBRS parameter sets configured to uniquely identify the plurality of remote units as a plurality of virtual CBSDs, respectively. The CBRS control circuit is also configured to communicate the plurality of CBRS parameter sets to a SAS coupled to the CBRS control circuit. The CBRS control circuit is also configured to receive at least one CBRS configuration parameter set corresponding to at least one selected remote unit among the plurality of remote units from the SAS. The CBRS control circuit is also configured to provide the at least one CBRS configuration parameter set to the routing circuit to cause the at least one selected remote unit to operate based on the at least one CBRS configuration parameter set.

An additional exemplary embodiment of the disclosure relates to a method for supporting CBRS in a DCS. The method includes generating a plurality of CBRS parameter sets configured to uniquely identify a plurality of remote units in the DCS as a plurality of virtual CBSDs, respectively. The plurality of remote units is configured to communicate at least one downlink communications signal and at least one uplink communications signal in one or more CBRS channels. The method also includes communicating the plurality of CBRS parameter sets to a SAS. The method also includes receiving at least one CBRS configuration parameter set corresponding to at least one selected remote unit among the plurality of remote units from the SAS. The method also includes causing the at least one selected remote unit to operate based on the at least one CBRS configuration parameter set.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Embodiments disclosed herein include distributed communications systems (DCSs) supporting virtualization of remote units as citizens band radio service (CBRS) devices (CBSDs). In examples discussed herein, a DCS includes a routing circuit that is coupled to a number of remote units configured to communicate a downlink communications signal(s) and an uplink communications signal(s) in one or more CBRS channels. For example, the DCS may be or include a distributed antenna system (DAS). Notably, the routing circuit may correspond to a CBRS device (CBSD) cell identification(s) that is configured to identify a CBRS signal node(s). Thus, all of the remote units in the DCS may appear as a single CBSD, making it difficult or impossible for a spectrum access system (SAS) to unambiguously identify each remote unit for channel assignment and/or transmit power adjustment to support CBRS. In this regard, in exemplary aspects disclosed herein, a CBRS control circuit is provided to present each of the remote units as a uniquely identifiable virtual CBSD (e.g., a software-based identification logically mapped to each of the remote units) to the SAS and facilitate communications between the SAS and the remote units. As such, the SAS may be spoofed to treat the uniquely identifiable virtual CBSD as real CBSDs to uniquely identify each of the remote units for CBRS channel assignment and/or transmission power control. As a result, it may be possible to support CBRS in the DCS in compliance with the Federal Communications Commission (FCC) requirements.

Figure 3:
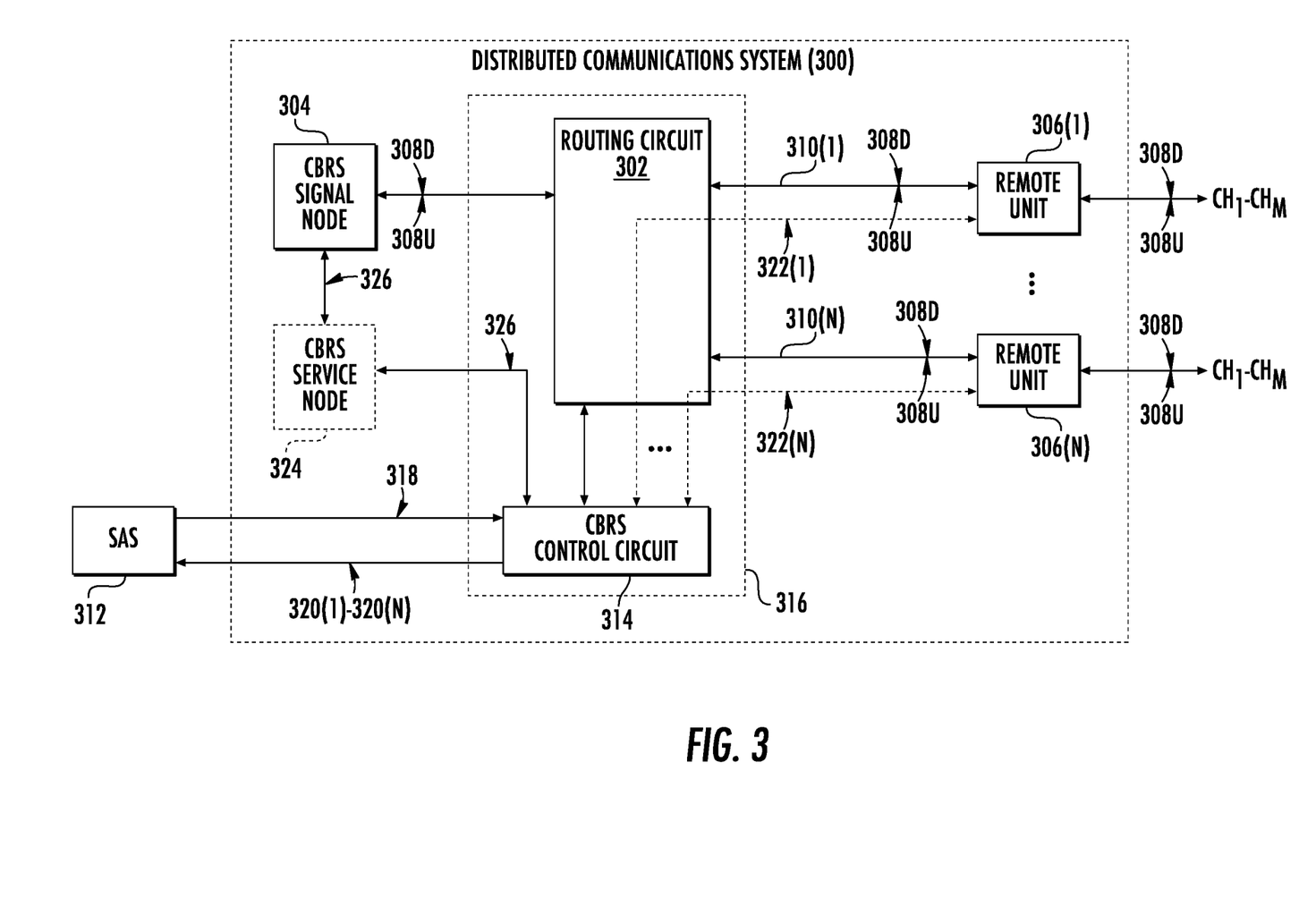
FIG. 3 is a schematic diagram of an exemplary DCS configured according to an embodiment of the present disclosure to support CBRS in accordance to the Federal Communications Commission (FCC) CBRS requirements.

In this regard, FIG. 3 is a schematic diagram of an exemplary DCS 300 configured according to an embodiment of the present disclosure to support CBRS in accordance to the FCC CBRS requirements. The DCS 300 includes a routing circuit 302, which can be a digital routing circuit for example. In examples discussed herein, the routing circuit 302 is coupled between at least one CBRS signal node 304, for example a digital baseband unit (BBU), and a number of remote units 306(1)-306(N). In a non-limiting example, the CBRS signal node 304 is associated with at least one CBSD cell identification configured to uniquely identify the CBRS signal node 304. As such, the CBRS signal node 304 may function as a CBSD in the DCS 300. Accordingly, the remote units 306(1)-306(N) are configured to communicate at least one downlink communications signal 308D and at least one uplink communications signal 308U in one or more CBRS channels $CH_1$-$CH_M$ based on the CBSD cell identification.

The routing circuit 302 may be coupled to the remote units 306(1)-306(N) via a number of communications mediums 310(1)-310(N), which can be optical-fiber based communications mediums for example. The routing circuit 302 may be configured to receive the downlink communications signal 308D from the CBRS signal node 304 and route the downlink communications signal 308D to the remote units 306(1)-306(N). The routing circuit 302 may be further configured to receive the uplink communications signal 308U from the remote units 306(1)-306(N) and provide the uplink communications signal 308U to the CBRS signal node 304. Notably, the remote units 306(1)-306(N) may be clustered (e.g., logically grouped) based on coverage and/or throughput requirements of the DCS 300. Each cluster may be configured to support a subset or all of the CBRS channels $CH_1$-$CH_M$. As such, the routing circuit 302 may be configured to route the downlink communications signal 308D to the remote units 306(1)-306(N) based on respective CBRS channel assignment of the remote units 306(1)-306(N).

The DCS 300 may be coupled to a SAS 312. As required by the FCC, the SAS 312 is configured to coordinate CBRS spectrum usage between holders of different license grades. Furthermore, according to FCC part 96.3, the SAS 312 also needs to coordinate CBRS spectrum usage in a multi-node CBRS system, such as the DCS 300. In this regard, it may be necessary for the SAS 312 to regulate CBRS spectrum usage and/or control transmission power among the remote units 306(1)-306(N) in the DCS 300. However, since the remote units 306(1)-306(N) in the DCS 300 are configured to operate based on the CBSD cell identification associated with the CBRS signal node 308, the SAS 312 may not be able to uniquely identify each of the remote units 306(1)-306(N), thus making it difficult for the SAS 312 to regulate CBRS spectrum usage and/or control transmission power among the remote units 306(1)-306(N) in the DCS 300. As such, it may be necessary to make the remote units 306(1)-306(N) uniquely identifiable to the SAS 312 such that the DCS 300 can be configured to operate in the CBRS channels $CH_1$-$CH_M$ in compliance with the FCC requirements.

In this regard, the DCS 300 can be configured to include a CBRS control circuit 314, which can be a circuit incorporating a microprocessor, a microcontroller, or a field-programmable gate array (FPGA), as examples. In one embodiment, the CBRS control circuit 314 can be provided in a separate circuit (e.g., printed circuit board) from the routing circuit 302. In an alternative embodiment, the CBRS control circuit 314 and the routing circuit 302 can be integrated into an integrated routing circuit 316. It should be appreciated that the CBRS control circuit 314 can also be integrated with other functional circuits in the DCS 300 without altering functionality and operational principles of the CBRS control circuit 314.

As discussed in detail below, the CBRS control circuit 314 can be configured to bridge communications between the SAS 312 and the remote units 306(1)-306(N). In one aspect, the CBRS control circuit 314 may present the remote units 306(1)-306(N) to the SAS 312 as uniquely identifiable virtual CBSDs, thus allowing the SAS 312 to manage the CBRS channels $CH_1$-$CH_M$ and perform transmission power control for each of the remote units 306(1)-306(N). In another aspect, the CBRS control circuit 314 can receive from the SAS 312 a CBRS configuration parameter set(s) 318 for a selected remote unit(s) among the remote units 306(1)-306(N). Accordingly, the CBRS control circuit 314 can cause the selected remote unit(s) to operate based on the CBRS configuration parameter set(s) 318. Notably, the CBRS control circuit 314 may cause the selected remote unit(s) to operate based on the CBRS configuration parameter set(s) 318 either by directly controlling the selected remote unit(s) or via the routing circuit 302. By using the CBRS control circuit 314 to bridge the communications between the SAS 312 and the remote units 306(1)-306(N), the DCS 300 can be configured to communicate the downlink communications signal 308D and the uplink communications signal 308U in the CBRS channels $CH_1$-$CH_M$ in compliance with the FCC requirements.

The CBRS control circuit 314 may be configured to generate a number of CBRS parameter sets 320(1)-320(N) to uniquely identify the remote units 306(1)-306(N) as the virtual CBSDs, respectively. Accordingly, the CBRS control circuit 314 communicates the CBRS parameter sets 320(1)-320(N) to the SAS 312 such that the SAS 312 can unambiguously identify each of the remote units 306(1)-306(N) based on the CBRS parameter sets 320(1)-320(N), respectively. In a non-limiting example, the remote units 306(1)-306(N) are configured to provide a number of remote unit parameter sets 322(1)-322(N) to the CBRS control circuit 314, either directly or via the routing circuit 302. Each of the remote unit parameter sets 322(1)-322(N) can include such parameters as remote unit physical location, remote unit location number, remote unit serial identification, and/or remote unit antenna above-ground-level (AGL) that can be used, either individually or in combination, to uniquely identify the remote units 306(1)-306(N). Accordingly, the CBRS control circuit 314 may include the remote unit parameter sets 322(1)-322(N) in the CBRS parameter sets 320(1)-320(N), respectively.

The CBRS control circuit 314 can be coupled to the CBRS signal node 304, either directly or via a CBRS service node 324, to receive a CBSD parameter set(s) 326, either directly from the CBRS signal node 304 or indirectly via the CBRS service node 324. The CBSD parameter set(s) 326 may include parameters such as the CBSD cell identification associated with the CBRS signal node 304, the CBRS channels $CH_1$-$CH_M$, a requested authorization status, a user contact information, a call sign, an air interface technology, a geographic location, an antenna height above-ground-level, a CBSD Category A class information, a CBSD Category B class information, an FCC identification number, a unique manufacturer's serial number, and/or information related to sensing capabilities. The CBRS control circuit 314 may be configured to include the CBSD parameter set(s) 326 in each of the CBRS parameter sets 320(1)-320(N). In this regard, the CBRS parameter sets 320(1)-320(N) may include parameters specific to the remote units 306(1)-306(N) as well as parameters specific to the CBRS signal node 304. Although the CBRS signal node 304 and the CBRS service node 324 are shown as separate elements, it should be appreciated that it may also be possible to integrate the CBRS signal node 304 and the CBRS service node 324 into a single box, such as a virtual baseband unit (vBBU). Notably, the CBRS signal node 304 may be part of a radio access network (RAN), depending on how different layers of the RAN are partitioned. For example, in a fifth-generation (5G) RAN, the CBRS signal node 304 can provided in a 5G central unit (CU) or a 5G distributed unit (DU).

Based on the CBRS parameter sets 320(1)-320(N) received from the CBRS control circuit 314, the SAS 312 may determine the CBRS configuration parameter set(s) 318 in accordance to the FCC requirements and provides the CBRS configuration parameter set(s) 318 to the CBRS control circuit 314. Accordingly, the CBRS control circuit 314 can cause the routing circuit 302, the CBRS signal node 304, and/or the remote units 306(1)-306(N) to operate based on the CBRS configuration parameter set(s) 318.

Figure 4:
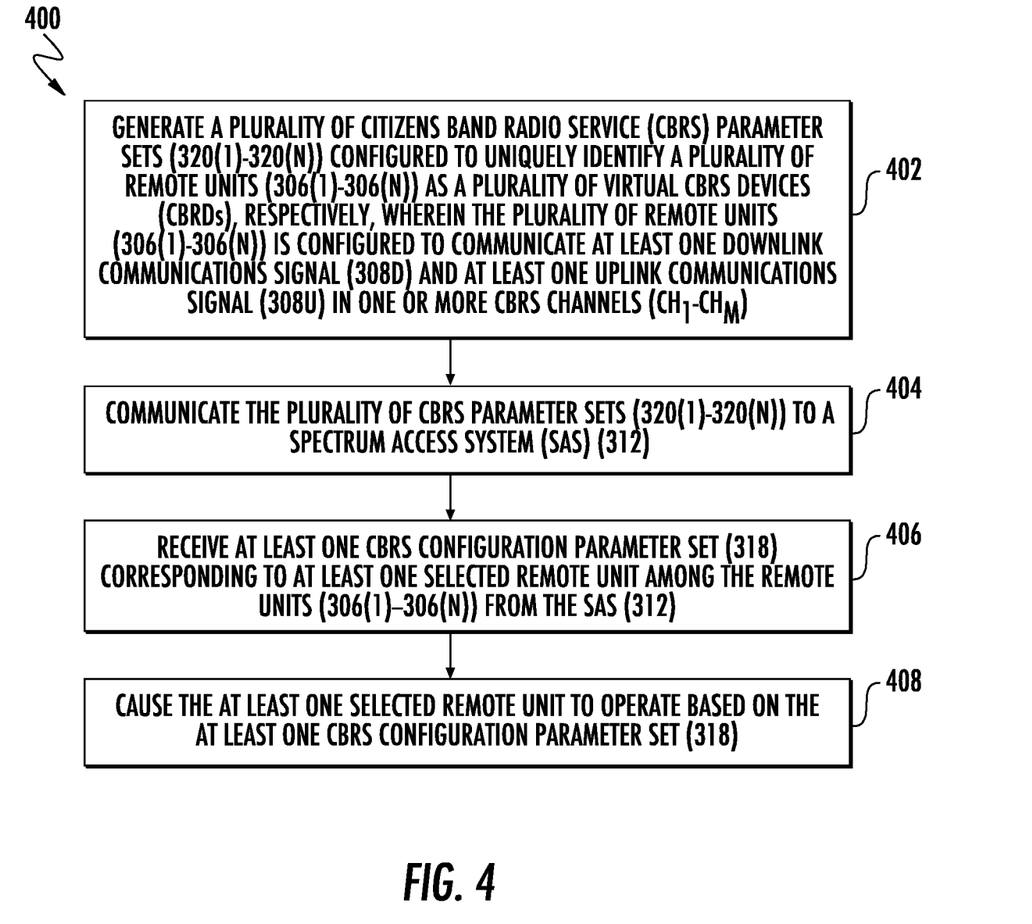
FIG. 4 is a flowchart of an exemplary process that can be employed by a CBRS control circuit in the DCS of FIG. 3 to support CBRS in compliance with the FCC requirements.

The CBRS control circuit 314 may be configured to bridge the communications between the SAS 312 and the remote units 306(1)-306(N) based on a process. In this regard, FIG. 4 is a flowchart of an exemplary process 400 that can be employed by the CBRS control circuit 314 in the DCS 300 to support CBRS in compliance with the FCC requirements.

According to the process 400, the CBRS control circuit 314 can be configured to generate the CBRS parameter sets 320(1)-320(N) to uniquely identify the remote units 306(1)-306(N), each configured to communicate the downlink communications signal 308D and the uplink communications signal 308U in the CBRS channels $CH_1$-$CH_M$, as the virtual CBSDs, respectively (block 402). The CBRS control circuit 314 can be further configured to communicate the CBRS parameter sets 320(1)-320(N) to the SAS 312 (block 404). The CBRS control circuit 314 can be further configured to receive the CBRS configuration parameter set(s) 318 corresponding to the selected remote unit(s) among the remote units 306(1)-306(N) (block 406). The CBRS control circuit 314 can be further configured to cause the selected remote unit(s) to operate based on the CBRS configuration parameter set(s) 318 (block 408).

With reference back to FIG. 3, the CBRS control circuit 314 can cause the routing circuit 302, the CBRS signal node 304, and/or the remote units 306(1)-306(N) to operate based on the CBRS configuration parameter set(s) 318 in a number of different ways. Specific non-limiting examples of configuration and operation scenarios are discussed next.

In one non-limiting example, the SAS 312 may generate the CBRS configuration parameter set(s) 318 to eliminate a selected CBRS channel(s) among the CBRS channels $CH_1$-$CN_M$ from the DCS 300. In this regard, in one embodiment, the CBRS control circuit 314 can be configured to cause the CBRS signal node 304 to stop communicating the downlink communications signal 308D and the uplink communications signal 308U in the selected CBRS channel(s). In another embodiment, the CBRS control circuit 314 can be configured to cause the routing circuit 302 to stop routing the downlink communications signal 308D and the uplink communications signal 308U in the selected CBRS channel(s). In another embodiment, the CBRS control circuit 314 can be configured to cause the remote units 306(1)-306(N) to stop communicating the downlink communications signal 308D and the uplink communications signal 308U in the selected CBRS channel(s). In another embodiment, the CBRS control circuit 314 can be configured to cause the CBRS signal node 304, the routing circuit 302, as well as the remote units 306(1)-306(N) to stop communicating/routing the downlink communications signal 308D and the uplink communications signal 308U in the selected CBRS channel(s). In yet another embodiment, the SAS 312 may provide the CBRS configuration parameter set(s) 318 directly to the CBRS signal node 304 and/or the routing circuit 302 to eliminate the selected CBRS channel(s).

In another non-limiting example, the SAS 312 may generate the CBRS configuration parameter set(s) 318 to eliminate the selected CBRS channel(s) among the CBRS channels $CH_1$-$CN_M$ from the selected remote unit(s) in the DCS 300. In this regard, in one embodiment, the CBRS control circuit 314 can be configured to cause the routing circuit 302 to stop routing the downlink communications signal 308D to the selected remote unit(s) in the selected CBRS channel(s) and stop providing the uplink communications signal 308U received from the selected remote unit(s) in the selected CBRS channel(s) to the CBRS signal node 304. In another embodiment, the CBRS control circuit 314 can be configured to cause the selected remote unit(s) to stop communicating the downlink communications signal 308D and the uplink communications signal 308U in the selected CBRS channel(s). In another embodiment, the CBRS control circuit 314 can be configured to cause the routing circuit 302 and the selected remote unit(s) to stop routing/communicating the downlink communications signal 308D and the uplink communications signal 308U in the selected CBRS channel(s).

As mentioned earlier, the remote units 306(1)-306(N) may be clustered (e.g., logically grouped) based on coverage and/or throughput requirements of the DCS 300. As such, an elimination of the selected CBRS channel(s) from the selected remote unit(s) may cause reclustering of the remote units 306(1)-306(N) in the DCS 300.

Figure 5A:
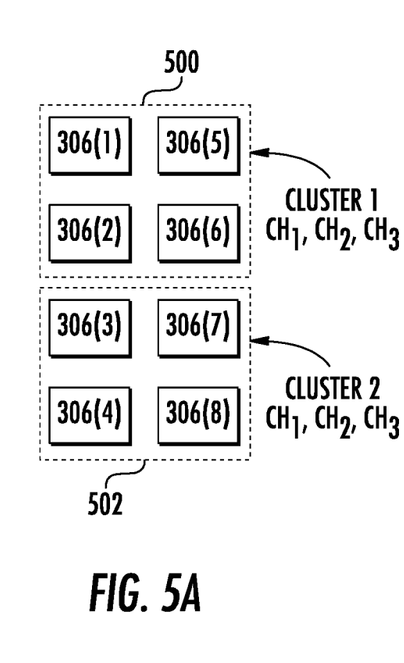
FIGS. 5A-5C are schematic diagrams providing an exemplary illustration of clustering and reclustering of a number of remote units in the DCS of FIG. 3.
Figure 5B:
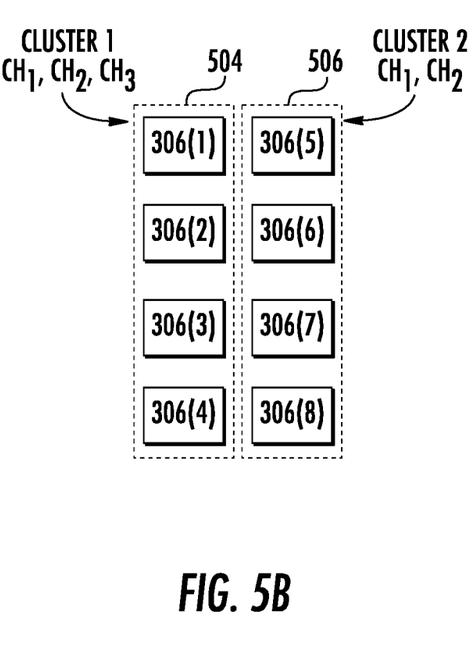
Figure 5C:
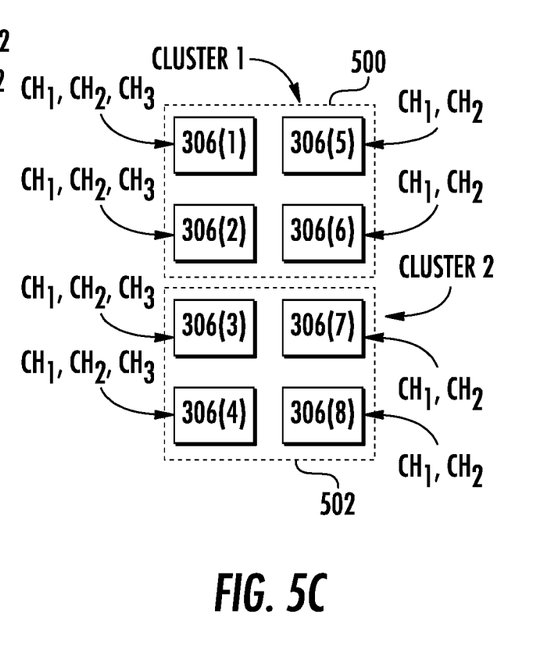

In this regard, FIGS. 5A-5C are schematic diagrams providing an exemplary illustration of clustering and reclustering of the remote units 306(1)-306(N) in the DCS 300 of FIG. 3. For the sake of clarity, FIGS. 5A-5C are described herein with reference to the remote units 306(1)-306(8) among the remote units 306(1)-306(N).

FIG. 5A provides an exemplary illustration of the remote units 306(1)-306(8) as the DCS 300 is initialized. As shown in FIG. 5A, the remote units 306(1)-306(8) are grouped into a first cluster 500 and a second cluster 502. The first cluster 500 includes the remote units 306(1), 306(2), 306(5), and 306(6). The second cluster 502 includes the remote units 306(3), 306(4), 306(7), and 306(8). All of the remote units 306(1)-306(8) are configured to communicate in the CBRS channels $CH_1$, $CH_2$, and $CH_3$ among the CBRS channels $CH_1$-$CH_M$.

FIG. 5B provides an exemplary illustration of reclustering of the remote units 306(1)-306(8) upon elimination of the selected CBRS channel(s) $CH_3$ from the selected remote unit(s) 306(5)-306(8). As shown in FIG. 5B, the remote units 306(1)-306(8) are reclustered into a first cluster 504 and a second cluster 506. The first cluster 504 includes the remote units 306(1)-304(4) that are configured to continue communicating on the CBRS channels $CH_1$, $CH_2$, and $CH_3$. The second cluster 506 includes the remote units 306(5)-304(8) that are configured to continue communicating on the CBRS channels $CH_1$ and $CH_2$. In this regard, each of the first cluster 504 and the second cluster 506 can include remote units communicating in identical CBRS channels.

FIG. 5C provides another exemplary illustration of reclustering of the remote units 306(1)-306(8) upon elimination of the selected CBRS channel(s) $CH_3$ from the selected remote unit(s) 306(5)-306(8). As shown in FIG. 5C, there is no change to the first cluster 500 and the second cluster 502, as previously illustrated in FIG. 5A, after the selected CBRS channel(s) $CH_3$ is eliminated from the selected remote unit(s) 306(5)-306(8). In this regard, each of the first cluster 500 and the second cluster 502 can include remote units communicating in different CBRS channels.

With reference back to FIG. 3, in another non-limiting example, the SAS 312 may generate the CBRS configuration parameter set(s) 318 to adjust maximum transmission power of the selected remote unit(s). In this regard, the CBRS control circuit 314 may compare the maximum transmission power provided by the SAS 312 with a current transmission power of the selected remote unit(s). If the maximum transmission power is higher than the current transmission power of the selected remote unit(s), the CBRS control circuit 314 may cause (e.g., via the routing circuit 302) the selected remote unit(s) to increase the current transmission power to the maximum transmission power indicated by the SAS 312. In contrast, if the maximum transmission power is lower than the current transmission power of the selected remote unit(s), the CBRS control circuit 314 may cause (e.g., via the routing circuit 302) the selected remote unit(s) to decrease the current transmission power to the maximum transmission power indicated by the SAS 312. If the maximum transmission power equals the current transmission power of the selected remote unit(s), the CBRS control circuit 314 may cause (e.g., via the routing circuit 302) the selected remote unit(s) to maintain the current transmission power.

The DCS 300 may be configured to provide and support any type of communications services and/or other communications services beyond CBRS. The communications circuits may support other RF communications services, which may include, but are not limited to, US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink), medical telemetry frequencies, WLAN, CBRS, WiMax, WiFi, Digital Subscriber Line (DSL), mmWave spectrum, 5G (NR), and LTE, etc.

Figure 6:
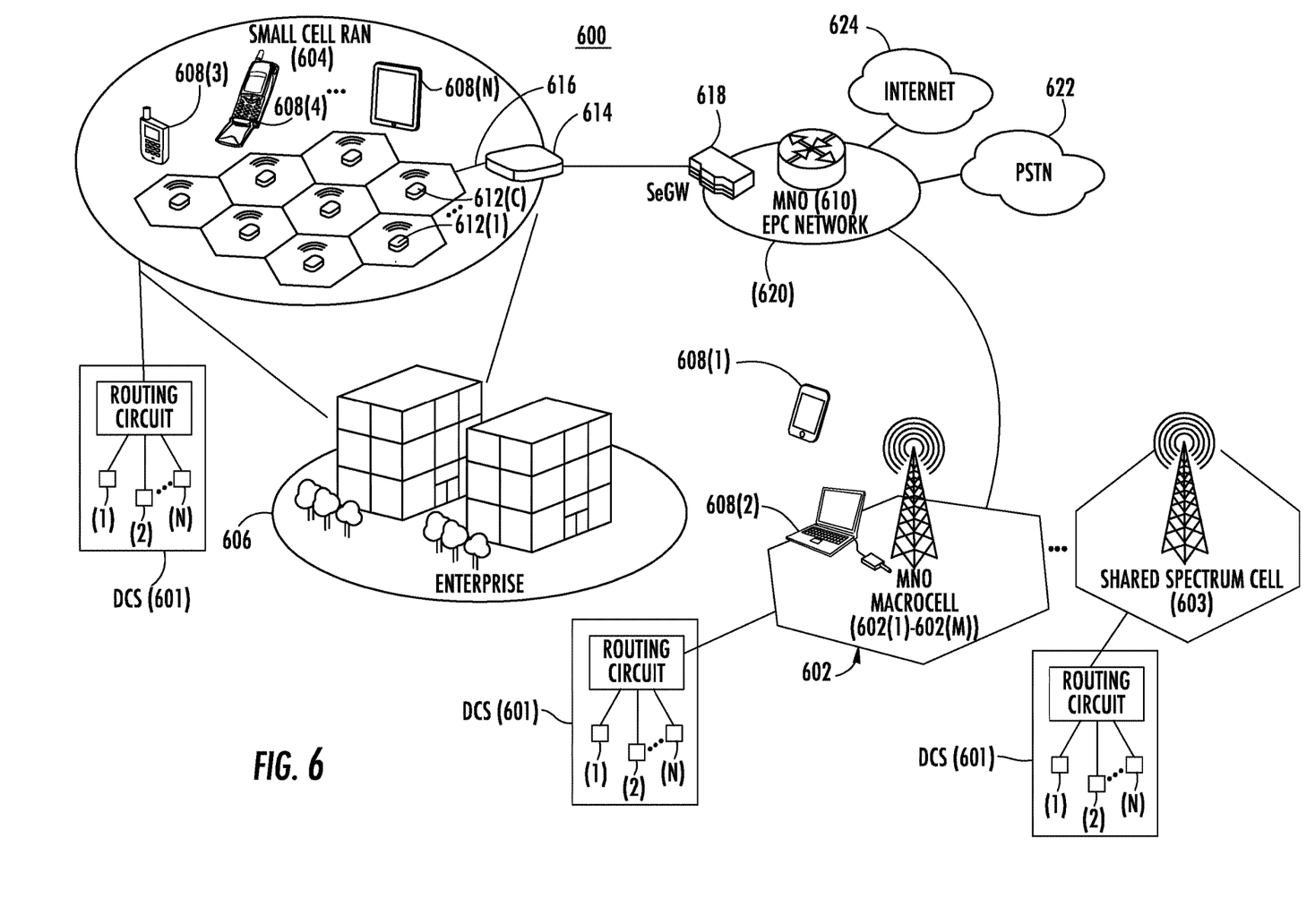
FIG. 6 is a schematic diagram of an exemplary mobile telecommunications environment that includes an exemplary radio access network (RAN) that includes a mobile network operator (MNO) macrocell employing a radio node, a shared spectrum cell employing a radio node, an exemplary small cell RAN employing a multi-operator radio node located within an enterprise environment, wherein any of the radio nodes can employ or be coupled to a shared spectrum DCS configured to selectively route channels of shared spectrum downlink communications signals of multiple service providers to remote units based on shared spectrum input information used to determine spectrum usage coordination between the remote units, including but not limited to the DCS of FIG. 3.

The DCS 300 configured to support CBRS can also be interfaced with different types of radio nodes of service providers and/or supporting service providers, including macrocell systems, small cell systems, and remote radio heads (RRH) systems, as examples. For example, FIG. 6 is a schematic diagram of an exemplary mobile telecommunications environment 600 (also referred to as "environment 600") that includes radio nodes and cells that may support shared spectrum, such as unlicensed spectrum, and can be interfaced to a shared spectrum DCSs 601 supporting coordination of distribution of shared spectrum from multiple service providers to remote units to be distributed to subscriber devices. The shared spectrum DCSs 601 can include the DCS 300 of FIG. 3 as an example.

The environment 600 includes exemplary macrocell RANs 602(1)-602(M) ("macrocells 602(1)-602(M)") and an exemplary small cell RAN 604 located within an enterprise environment 606 and configured to service mobile communications between a user mobile communications device 608(1)-608(N) to a mobile network operator (MNO) 610. A serving RAN for a user mobile communications device 608(1)-608(N) is a RAN or cell in the RAN in which the user mobile communications devices 608(1)-608(N) have an established communications session with the exchange of mobile communications signals for mobile communications. Thus, a serving RAN may also be referred to herein as a serving cell. For example, the user mobile communications devices 608(3)-608(N) in FIG. 6 are being serviced by the small cell RAN 604, whereas user mobile communications devices 608(1) and 608(2) are being serviced by the macrocell 602. The macrocell 602 is an MNO macrocell in this example. However, a shared spectrum RAN 603 (also referred to as "shared spectrum cell 603") includes a macrocell in this example and supports communications on frequencies that are not solely licensed to a particular MNO, such as CBRS for example, and thus may service user mobile communications devices 608(1)-608(N) independent of a particular MNO. For example, the shared spectrum cell 603 may be operated by a third party that is not an MNO and wherein the shared spectrum cell 603 supports CBRS. Also, as shown in FIG. 6, the MNO macrocell 602, the shared spectrum cell 603, and/or the small cell RAN 604 can interface with a shared spectrum DCS 601 supporting coordination of distribution of shared spectrum from multiple service providers to remote units to be distributed to subscriber devices. The MNO macrocell 602, the shared spectrum cell 603, and the small cell RAN 604 may be neighboring radio access systems to each other, meaning that some or all can be in proximity to each other such that a user mobile communications device 608(3)-608(N) may be able to be in communications range of two or more of the MNO macrocell 602, the shared spectrum cell 603, and the small cell RAN 604 depending on the location of user mobile communications devices 608(3)-608(N).

In FIG. 6, the mobile telecommunications environment 600 in this example is arranged as an LTE (Long Term Evolution) system as described by the Third Generation Partnership Project (3GPP) as an evolution of the GSM/UMTS standards (Global System for Mobile communication/Universal Mobile Telecommunications System). It is emphasized, however, that the aspects described herein may also be applicable to other network types and protocols, such as fifth-generation (5G) and/or 5G new radio (5G-NR) networks. The mobile telecommunications environment 600 includes the enterprise 606 in which the small cell RAN 604 is implemented. The small cell RAN 604 includes a plurality of small cell radio nodes 612(1)-612(C). Each small cell radio node 612(1)-612(C) has a radio coverage area (graphically depicted in the drawings as a hexagonal shape) that is commonly termed a "small cell." A small cell may also be referred to as a femtocell or, using terminology defined by 3GPP, as a Home Evolved Node B (HeNB). In the description that follows, the term "cell" typically means the combination of a radio node and its radio coverage area unless otherwise indicated.

In FIG. 6, the small cell RAN 604 includes one or more services nodes (represented as a single services node 614) that manage and control the small cell radio nodes 612(1)-612(C). In alternative implementations, the management and control functionality may be incorporated into a radio node, distributed among nodes, or implemented remotely (i.e., using infrastructure external to the small cell RAN 604). The small cell radio nodes 612(1)-612(C) are coupled to the services node 614 over a direct or local area network (LAN) connection 616 as an example, typically using secure IPsec tunnels. The small cell radio nodes 612(1)-612(C) can include multi-operator radio nodes. The services node 614 aggregates voice and data traffic from the small cell radio nodes 612(1)-612(C) and provides connectivity over an IPsec tunnel to a security gateway (SeGW) 618 in a network 620 (e.g., evolved packet core (EPC) network in a 4G network, or 5G Core in a 5G network) of the MNO 610. The network 620 is typically configured to communicate with a public switched telephone network (PSTN) 622 to carry circuit-switched traffic, as well as for communicating with an external packet-switched network such as the Internet 624.

The environment 600 also generally includes a node (e.g., eNodeB or gNodeB) base station, or "macrocell" 602. The radio coverage area of the macrocell 602 is typically much larger than that of a small cell where the extent of coverage often depends on the base station configuration and surrounding geography. Thus, a given user mobile communications device 608(3)-608(N) may achieve connectivity to the network 620 (e.g., EPC network in a 4G network, or 5G Core in a 5G network) through either a macrocell 602 or small cell radio node 612(1)-612(C) in the small cell RAN 604 in the environment 600.

Figure 7:
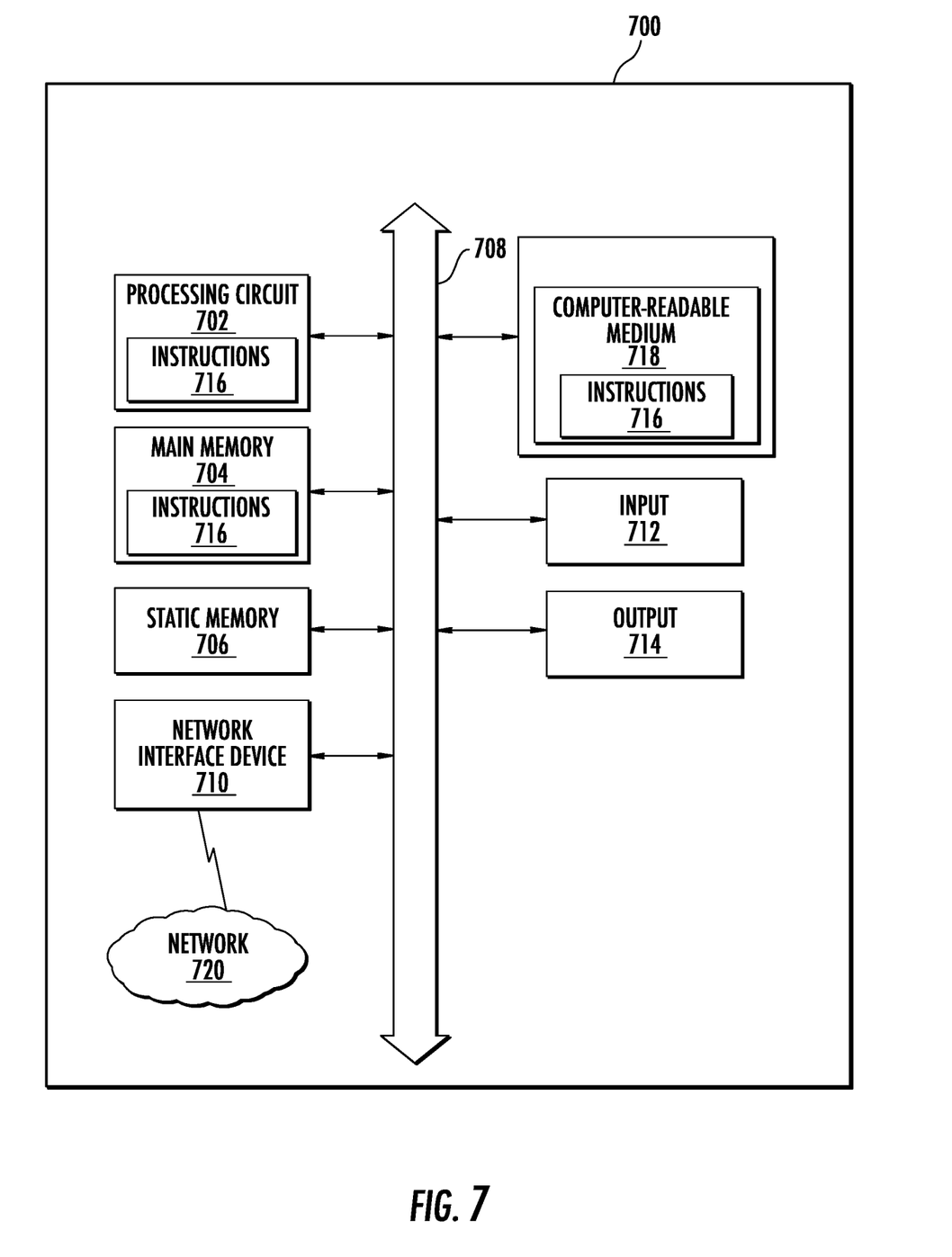
FIG. 7 is a schematic diagram of a representation of an exemplary computer system that can be included in or interface with any of the components in the DCS of FIG. 3, including a CBRS control circuit, a routing circuit, a spectrum usage coordination circuit, and remote units, wherein the exemplary computer system is configured to execute instructions from an exemplary computer-readable medium.

Any of the circuits in the DCS 300 of FIG. 3 (e.g., the CBRS control circuit 314) can include a computer system 700, such as shown in FIG. 7, to carry out their functions and operations. With reference to FIG. 7, the computer system 700 includes a set of instructions for causing the multi-operator radio node component(s) to provide its designed functionality, and their circuits discussed above. The multi-operator radio node component(s) may be connected (e.g., networked) to other machines in a LAN, an intranet, an extranet, or the Internet. The multi-operator radio node component(s) may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The multi-operator radio node component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server, edge computer, or a user's computer. The exemplary computer system 700 in this embodiment includes a processing circuit or processor 702, a main memory 704 (e.g., read-only memory (ROM), flash memory, dynamic random access memory (DRAM) such as synchronous DRAM (SDRAM), etc.), and a static memory 706 (e.g., flash memory, static random access memory (SRAM), etc.), which may communicate with each other via a data bus 708. Alternatively, the processing circuit 702 may be connected to the main memory 704 and/or static memory 706 directly or via some other connectivity means. The processing circuit 702 may be a controller, and the main memory 704 or static memory 706 may be any type of memory.

The processing circuit 702 represents one or more general-purpose processing circuits such as a microprocessor, central processing unit, or the like. More particularly, the processing circuit 702 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing circuit 702 is configured to execute processing logic in instructions 716 for performing the operations and steps discussed herein.

The computer system 700 may further include a network interface device 710. The computer system 700 also may or may not include an input 712 to receive input and selections to be communicated to the computer system 700 when executing instructions. The computer system 700 also may or may not include an output 714, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 700 may or may not include a data storage device that includes instructions 716 stored in a computer-readable medium 718. The instructions 716 may also reside, completely or at least partially, within the main memory 704 and/or within the processing circuit 702 during execution thereof by the computer system 700, the main memory 704 and the processing circuit 702 also constituting computer-readable medium. The instructions 716 may further be transmitted or received over a network 720 via the network interface device 710.

While the computer-readable medium 718 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing circuit and that cause the processing circuit to perform any one or more of the methodologies of the embodiments disclosed herein. The term "computer-readable medium" shall accordingly be taken to include, but not be limited to, solid-state memories, optical and magnetic medium, and carrier wave signals.

Note that as an example, any "ports," "combiners," "splitters," and other "circuits" mentioned in this description may be implemented using Field Programmable Logic Array(s) (FPGA(s)) and/or a digital signal processor(s) (DSP(s)), and therefore, may be embedded within the FPGA or be performed by computational processes.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred. It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A distributed communications system (DCS), comprising:
   a plurality of remote units;
   a routing circuit corresponding to at least one citizens band radio service (CBRS) device (CBSD) cell identification, the routing circuit coupled to the plurality of remote units, wherein the plurality of remote units are configured to communicate at least one downlink communications signal and at least one uplink communications signal in one or more CBRS channels; and
   a CBRS control circuit coupled to the routing circuit, the CBRS control circuit configured to:
      generate a plurality of CBRS parameter sets configured to identify the plurality of remote units as a plurality of virtual CBSDs, respectively;
      communicate the plurality of CBRS parameter sets to a spectrum access system (SAS);
      receive at least one CBRS configuration parameter set corresponding to at least one selected remote unit among the plurality of remote units; and
      provide the at least one CBRS configuration parameter set to the routing circuit to cause the at least one selected remote unit to operate based on the at least one CBRS configuration parameter set.

2. The DCS of claim 1, wherein the routing circuit is further configured to:
   receive a plurality of remote unit parameter sets from the plurality of remote units, respectively; and
   provide the plurality of remote unit parameter sets to the CBRS control circuit.

3. The DCS of claim 2, wherein the routing circuit is further configured to:
   receive the at least one CBRS configuration parameter set from the CBRS control circuit; and
   provide the at least one CBRS configuration parameter set to the at least one selected remote unit.

4. The DCS of claim 3, wherein each of the plurality of remote unit parameter sets comprises at least one parameter selected from the group consisting of: a remote unit location number, a remote unit serial identification, and a remote unit antenna above-ground-level (AGL).

5. The DCS of claim 3, wherein the CBRS control circuit is configured to generate the plurality of CBRS parameter sets comprising the plurality of remote unit parameter sets, respectively.

6. The DCS of claim 5, further comprising at least one CBRS signal node associated with the at least one CBSD cell identification and coupled to the routing circuit and the CBRS control circuit, the at least one CBRS signal node configured to:
   provide the at least one downlink communications signal to the routing circuit for distribution to the plurality of remote units; and
   receive the at least one uplink communications signal from the plurality of remote units via the routing circuit.

7. The DCS of claim 6, further comprising at least one CBRS service node coupled between the at least one CBRS signal node and the CBRS control circuit, the at least one CBRS service node configured to facilitate communications between the at least one CBRS signal node and the CBRS control circuit.

8. The DCS of claim 6, wherein the CBRS control circuit is further configured to receive at least one CBSD parameter set from the at least one CBRS signal node.

9. The DCS of claim 8, wherein the at least one CBSD parameter set comprises at least one parameter selected from the group consisting of: the at least one CBSD cell identification, the one or more CBRS channels, a requested authorization status, a call sign, a user contact information, an air interface technology, a geographic location, an antenna height above-ground-level, a CBSD Category A class information, a CBSD Category B class information, a Federal Communications Commission (FCC) identification number, a unique manufacturer's serial number, and information related to sensing capabilities.

10. The DCS of claim 8, wherein the CBRS control circuit is configured to generate the plurality of CBRS parameter sets each comprising the at least one CBSD parameter set.

11. The DCS of claim 6, wherein the CBRS control circuit is further configured to receive the at least one CBRS configuration parameter set comprising an instruction to eliminate a selected CBRS channel among the one or more CBRS channels from the DCS.

12. The DCS of claim 11, wherein the CBRS control circuit is further configured to cause the at least one CBRS signal node to stop communicating the at least one downlink communications signal and the at least one uplink communications signal in the selected CBRS channel.

13. The DCS of claim 6, wherein the CBRS control circuit is further configured to receive the at least one CBRS configuration parameter set comprising an instruction to eliminate a selected CBRS channel among the one or more CBRS channels from the DCS.

14. The DCS of claim 13, wherein the CBRS control circuit is further configured to cause the routing circuit to stop routing the at least one downlink communications signal and the at least one uplink communications signal in the selected CBRS channel.

15. The DCS of claim 6, wherein the CBRS control circuit is further configured to receive the at least one CBRS configuration parameter set comprising an instruction to eliminate a selected CBRS channel among the one or more CBRS channels from the DCS.

16. The DCS of claim 15, wherein the CBRS control circuit is further configured to cause the plurality of remote units to stop communicating the at least one downlink communications signal and the at least one uplink communications signal in the selected CBRS channel.

17. The DCS of claim 6, wherein the CBRS control circuit is further configured to receive the at least one CBRS configuration parameter set comprising an instruction to eliminate a selected CBRS channel among the one or more CBRS channels from the at least one selected remote unit.

18. The DCS of claim 17, wherein the CBRS control circuit is further configured to:
cause the routing circuit to stop communicating the at least one downlink communications signal to the at least one selected remote unit in the selected CBRS channel; and
cause the routing circuit to stop providing the at least one uplink communications signal received from the at least one selected remote unit in the selected CBRS channel to the at least one CBRS signal node.

19. The DCS of claim 6, wherein the CBRS control circuit is further configured to:
receive the at least one CBRS configuration parameter set comprising an instruction to eliminate a selected CBRS channel among the one or more CBRS channels from the at least one selected remote unit; and
cause the at least one selected remote unit to stop communicating the at least one downlink communications signal and the at least one uplink communications signal in the selected CBRS channel.

20. The DCS of claim 6, wherein the CBRS control circuit is further configured to:
receive the at least one CBRS configuration parameter set comprising an instruction to eliminate a selected CBRS channel among the one or more CBRS channels from the at least one selected remote unit;
cause the routing circuit to stop routing the at least one downlink communications signal to the at least one selected remote unit in the selected CBRS channel;
cause the routing circuit to stop providing the at least one uplink communications signal received from the at least one selected remote unit in the selected CBRS channel to the at least one CBRS signal node; and
cause the at least one selected remote unit to stop communicating the at least one downlink communications signal and the at least one uplink communications signal in the selected CBRS channel.

21. The DCS of claim 6, wherein the CBRS control circuit is further configured to:
receive the at least one CBRS configuration parameter set comprising an instruction to eliminate a selected CBRS channel among the one or more CBRS channels from the at least one selected remote unit; and
cluster the at least one selected remote unit with at least one other remote unit among the plurality of remote units, wherein the at least one selected remote unit and the at least one other remote unit are configured to communicate the at least one downlink communications signal and the at least one uplink communications signal in one or more identical CBRS channels.

22. The DCS of claim 6, wherein the CBRS control circuit is further configured to:
receive the at least one CBRS configuration parameter set comprising an instruction to eliminate a selected CBRS channel among the one or more CBRS channels from the at least one selected remote unit; and
cluster the at least one selected remote unit with at least one other remote unit among the plurality of remote units, wherein the at least one selected remote unit and the at least one other remote unit are configured to communicate the at least one downlink communications signal and the at least one uplink communications signal in one or more different CBRS channels.

23. The DCS of claim 6, wherein the CBRS control circuit is further configured to:
receive the at least one CBRS configuration parameter set comprising a maximum transmission power for the at least one selected remote unit;
determine whether the at least one selected remote unit is transmitting in a transmission power higher than the maximum transmission power; and
cause the at least one selected remote unit to reduce the transmission power in response to the transmission power being higher than the maximum transmission power.

24. The DCS of claim 23, wherein the CBRS control circuit is further configured to:
cause the at least one selected remote unit to increase the transmission power in response to the transmission power being lower than the maximum transmission power; and
cause the at least one selected remote unit to maintain the transmission power in response to the transmission power being equal to the maximum transmission power.

* * * * *

UNITED STATES PATENT AND TRADEMARK OFFICE
CERTIFICATE OF CORRECTION

PATENT NO.      : 11,889,389 B2
APPLICATION NO. : 17/533331
DATED           : January 30, 2024
INVENTOR(S)     : Dror Harel It is certified that error appears in the above-identified patent and that said Letters Patent is hereby corrected as shown below:

On the Title Page

Item (63), in Column 1, in "Related U.S. Application Data", Line 2, below "Nov. 4, 2019, now Pat. No. 11,184,743." insert -- (60) Provisional application No. 62/908,066, filed on Sep. 30, 2019. --.

Signed and Sealed this
Fourth Day of June, 2024

Katherine Kelly Vidal
*Director of the United States Patent and Trademark Office*